(12) United States Patent
Zunke

(10) Patent No.: US 7,831,051 B2
(45) Date of Patent: Nov. 9, 2010

(54) SECURE COMMUNICATION BETWEEN A HARDWARE DEVICE AND A COMPUTER

(75) Inventor: Michael Zunke, Kirchheim (DE)

(73) Assignee: Aladdin Europe GmbH, Germering (DE)

( * ) Notice: Subject to any disclaimer, the term of this patent is extended or adjusted under 35 U.S.C. 154(b) by 764 days.

(21) Appl. No.: 11/685,223

(22) Filed: Mar. 13, 2007

(65) Prior Publication Data

US 2008/0226065 A1    Sep. 18, 2008

(51) Int. Cl.
*H04L 9/08* (2006.01)
*H04L 9/12* (2006.01)

(52) U.S. Cl. .................. 380/278; 380/277; 713/150; 713/168; 713/169; 713/172

(58) Field of Classification Search .......... None
See application file for complete search history.

(56) References Cited

U.S. PATENT DOCUMENTS

| | | | |
|---|---|---|---|
| 7,200,756 B2 * | 4/2007 | Griffin et al. | 713/189 |
| 2004/0039924 A1 * | 2/2004 | Baldwin et al. | 713/189 |
| 2004/0101141 A1 * | 5/2004 | Alve | 380/278 |
| 2005/0182934 A1 * | 8/2005 | Elteto | 713/169 |

\* cited by examiner

*Primary Examiner*—Ian N Moore
*Assistant Examiner*—Alexander Lagor
(74) *Attorney, Agent, or Firm*—Drinker Biddle & Reath LLP

(57) ABSTRACT

A group of sets is provided, each including a secret and an assigned identifier. The sets are stored in a hardware device that can retrieve the secret of any of the sets using the secret's corresponding identifier. A set is stored in an application, and the application is delivered to a user who runs it on a computer coupled to the device. The application defines a session key, generates session data including the stored set's identifier and the session key encrypted with the stored set's corresponding secret, and sends the session data to the device. The device retrieves from the session data the encrypted session key and the identifier, retrieves from its storage the secret corresponding to the identifier, and uses the secret to decrypt the session key. The session key is then used as a shared key for secure communications between the hardware device and the computer.

15 Claims, 7 Drawing Sheets

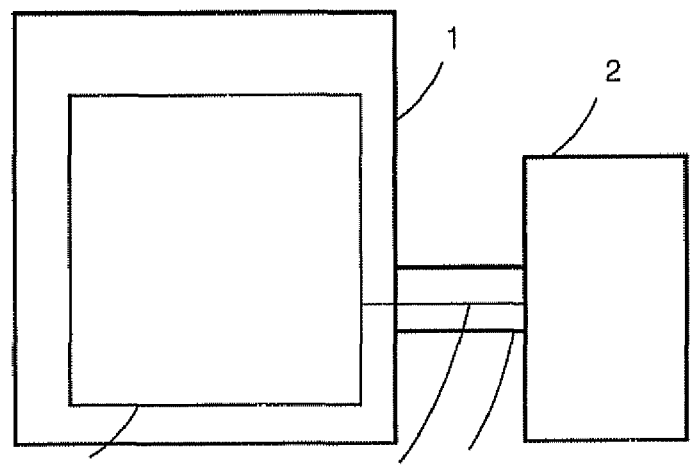
3, 3'       4   5          Fig. 1
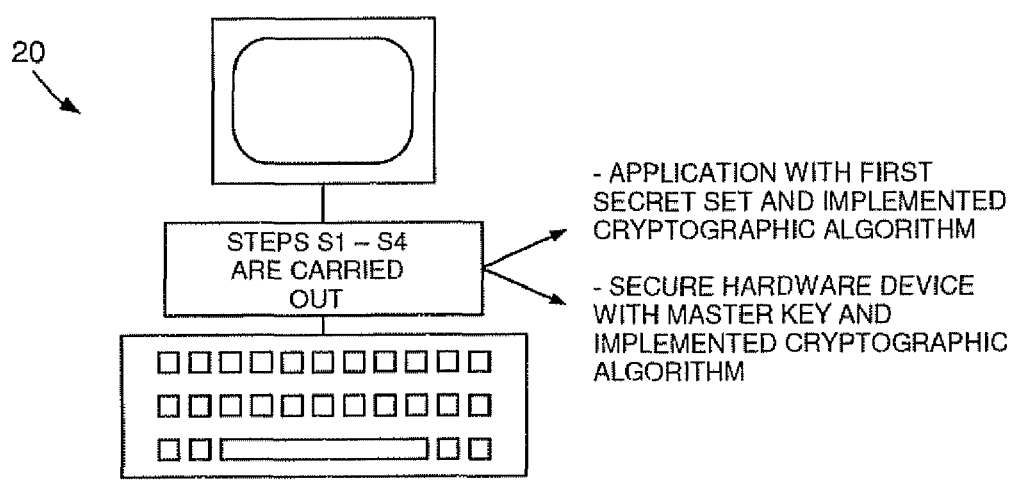
Fig. 8

SECURE COMMUNICATION BETWEEN A HARDWARE DEVICE AND A COMPUTER

FIELD OF INVENTION

The present invention relates to the field of secure communication in an insecure environment.

BACKGROUND OF THE INVENTION

There exists a need for secure communication in an insecure environment between a secure hardware device connected to a computer and the computer. For example for stopping illegal use, copying and distribution of a software application it is known to amend the software application before distribution such that the software application can only be executed on the computer when the secure hardware device is connected to the computer. However, the secure hardware device is connected to the computer via a common interface, e.g. a USB port, which itself is not secure, and a cracker can eavesdrop on the data transmitted through the insecure interface or channel, in order to crack the software application.

Therefore, it is an object of the present invention to provide an improved method for secure communication between a secure hardware device connected to a computer and the computer.

It is a further object of the present invention to provide an apparatus for changing a shared secret for generating a session key for secure communication between a secure hardware device connected to a computer and the computer.

Other objects and advantages of the invention will become apparent as the description proceeds.

SUMMARY OF THE INVENTION

In one aspect, the present invention is directed to a method for secure communication between a secure hardware device connected to the computer and the computer, the method comprising the steps of:

a) defining a group of secret sets including at least two secret sets, each of which includes a secret and an assigned identifier, b) storing the group of secret sets in the secure hardware device in such a manner that the secure hardware device can retrieve the secret of any of said secret sets from the assigned identifier, c) selecting a first one of said secret sets and storing said selected first secret set in a first application, d) delivering the first application which includes the first secret set to a user who executes the first application on a computer being connected to the secure hardware device, e) wherein the first application defines a first session key and generates first session key indication data based on the first secret set said first session key indication data including the identifier of the first secret set as the only element from the first secret set, and transmits said first session key indication data to the secure hardware device, which retrieves, as a first secret, the secret of the first secret set based on the identifier included in the first session key indication data and further retrieves the first session key from said first session key indication data based on the first secret, so that for secure communication the first session key for encrypting and decrypting of data to be transmitted through the channel is shared.

With this method it is possible to share the first session key in a secure manner through an insecure communication channel between the secure hardware device and the computer. The thus shared first session key can then be used by the first application and the secure hardware device for encrypting and decrypting of the data to be transmitted through an insecure environment between the secure hardware device and the first application (computer).

The method can further comprise the steps of:

f) selecting a second one of said secret sets and storing said selected second secret set in a second application, g) delivering said second application to said user executing the second application on a computer connected to the secure hardware device, h) wherein the second application defines a second session key and generates second session key indication data based on the second secret set, said second session key indication data including the identifier of the second secret set as the only element from the second secret set, and transmits said second session key indication data to the secure hardware device, which retrieves, as a second secret, the secret of the second secret set based on the identifier included in the second session key indication data and further retrieves the second session key from said second session key indication data based on the second secret.

With these steps it is possible, to change the shared secret for generating or defining a session key without having to change anything in the secure hardware device. Therefore, even if the secure hardware device is in the possession of the user, the shared secret can be changed in a secure manner.

Further, it is possible that in step e)
  the first application encrypts the generated first session key with the secret of the first secret set and transmits the identifier of the first secret set together with the encrypted first session key as said first session key indication data to said hardware device, and
  the secure hardware device decrypts the encrypted first session key using the retrieved first secret.

It is further possible, that in step h)
  the second application encrypts the generated second session key with the secret of the second secret set and transmits the identifier of the second secret set together with the encrypted second session key as said second session key indication data to said hardware device, and
  the secure hardware device decrypts the encrypted second session key using the retrieved second secret.

Due to the encryption of the session key to be transmitted, it can be ensured that the session key is shared in a secure manner, even if the transmission is carried out in an insecure environment.

In a preferred embodiment in step a) the group of secret sets is defined by encrypting each of a group of identifiers by a master key using a symmetrical encryption method, and in step b) the master key is stored and the symmetrical encryption method is implemented in the secure hardware device. With these steps it is possible to minimize the processing power compared with an asymmetric encryption/decryption method. Further the storage requirements in the secure hardware device are minimized, since for storing the group of secret sets in the secure hardware device only the master key is to be stored and the encryption method is to be implemented and, for example, no table including all secret sets has to be stored in the secure hardware device.

In step b) the group of secrets can be stored in a dynamically manner such that the secure hardware device can compute the secret based on the identifier included in the session key indication data. An example for such a dynamically manner is the use of an encryption/decryption method, which can be realized as a symmetrical or asymmetrical method.

Further, it is possible to use and implement a pseudo random generator, which generates a series of random values which are no predictable, if one knows at least one random value of the series. In other words, it is not possible to derive any random value of the series from a known value of the series. However, the series of random values depends on the starting conditions and is always the same for one specific starting condition. Therefore, the starting conditions of the pseudo random generator for defining the group of secrets in step a) are also used as starting conditions for the pseudo random generator implemented in the secure hardware device (both pseudo random generators for steps a) and e) correspond each other in function), so that the identifier, for example, can be used as indicator for the $x^{th}$ random number of the series (for example the first, second, third, random number).

It is further possible to realize the dynamically stored group of the secrets by a hash function implemented in the secure hardware device and a master key stored in the secure hardware device. The secrets of the group of secrets are defined in step a) by using the same hash function and the same master key and the corresponding identifiers, so that the secret of specific secret set can be derived in the secure hardware device by carrying out the hash function with the transmitted identifier and the stored master key.

Of course, it is possible to store the group of secret sets in the secure hardware device in a static manner, for example as look-up table. In this case, the secure hardware device only reads out the entry in the look-up table which is stored for the transmitted identifier. Therefore, the method can be implemented even in secure hardware devices having weak processing power.

The second application delivered in step g) can be an update for the first application running on the computer. Further, it is possible that a second application delivered in step g) is a separate application.

The secret sets can be assigned to different levels and once a secure hardware device has retrieved a secret based on an identifier of a secret set of a first level the secure hardware device does not accept secrets based on identifiers of secret sets of a level lower than the first level. If the secure hardware device does not accept a secret, the secure hardware device does not use the secret for retrieving a session key so that sharing a session key for a secure communication was not successful.

Further, the secret sets can be assigned to different levels and in the secure hardware device, which is in the possession of the user, a first level can be set so that the secure hardware device only accepts secrets based on identifiers of secret sets of a level higher than the said first level.

In the method the first application can generate a random value as the session key. Further, also the second application can generate a random value as a session key. The random value can be a string, a figure, or any other value which can be computed.

In a further embodiment of the method an authentication procedure for the application communicating with the secure hardware device can be implemented. For authentication the secure hardware device generates an authentication value and transmits the authentication value to the first or second application, the first or second application encrypts the received authentication value with the secret of the first or second secret set, respectively, and transmits the encrypted authentication value to the secure hardware device, which decrypts the encrypted authentication value with the first or second secret, respectively, and compares the decrypted authentication value with the generated authentication value and, only if those authentication values are identical, the secure hardware device uses the session key for encrypting and decrypting. By these steps it can be ensured that the secure hardware device is really communicating with the first or second application, respectively.

The authentication value can be a random value generated by the secure hardware device.

Preferably, the group of secret sets is defined in step a) such that it is impossible to derive a secret if only the identifier of the secret set is known.

Further, the secure hardware device can be used to avoid unauthorized use of the first and second application, respectively.

In another preferred aspect, the present invention is directed to a method of establishing a secure communication channel in a renewable manner between a secure hardware device connected to a computer and said computer, wherein a group of secret sets including at least two secret sets, each of which includes a secret and an assigned identifier, is stored in the secure hardware device in such a manner that the secure hardware device can retrieve the secret of any of said secret sets from the assigned identifier, and a first one of said secret sets is stored in a first application running on said computer, said method comprising the steps of:

A) said first application defining a first session key and generating first session key indication data based on the first secret sets, said first session key indication data including the identifier of the first secret set as the only element from the first secret set, and transmitting said first session key indication data to the secure hardware device, B) said secure hardware device retrieving, as a first secret, the secret of the first secret set based on the identifier included in the first session key indication data and further retrieving the first session key from said first session key indication data based on the first secret, so that for the secure communication channel the first session key for encrypting and decrypting of data to be transmitted through the channel is shared, wherein, for renewing the secure communication channel, C) a second application with a second one of said secret sets is executed on the computer connected to the secure hardware device, D) said second application defining a second session key and generating a second session key indication data based on the second secret set, said second session key indication data including the identifier of the second secret set as the only element from the second secret set, and said second session key indication data is transmitted to the secure hardware device, E) said secure hardware device retrieves, as a second secret, the secret of the second secret set based on the identifier included in the second session key indication data and further retrieves the second session key from said second session key indication data based on the second secret, so that for the secure communication channel the second session key for encrypting and decrypting of data to be transmitted through the channel is shared.

By this method it is possible to renew the shared secret between the application and the secure hardware device which is needed to share the session key in a secure manner.

In step B) it is possible that the first application encrypts the generated first session key with said first secret and transmits the identifier of the first secret set together with the encrypted first session key as said first session key indication data to said hardware device through an insecure environment, and that the secure hardware device decrypts the encrypted first session key using the retrieved first secret.

Further, it is possible that in step D) the second application encrypts the generated second session key with the secret of the second secret set and transmits the identifier of the second secret set together with the encrypted second session key as said second session key indication data to said secure hardware device through an insecure environment, and that the secure hardware device decrypts the encrypted second session key using the retrieved second secret.

Further, the group of secret sets can be defined by encrypting each of a group of identifiers with a master key using a symmetrical encryption method and the master key is stored and the symmetrical encryption method is implemented in the secure hardware device.

The second application of step C) can be an update for the first application or can be a separate application.

The secret sets can be assigned to different levels and once the secure hardware device has retrieved a secret based on an identifier of a secret set of a first level the secure hardware device does not accept secrets based on identifiers of secret sets of a level lower than the first level.

The secret sets can be assigned to different levels and in the secure hardware device, which is in the possession of the user, a first level can be set so that the secure hardware device only accepts secrets based on identifiers of secret sets of the level higher than the said first level.

As the session key defined in step A) or D) a random value can be used.

In the method there can be further steps for authentication of the first and second application, respectively.

For example, the authentication procedure for the application communicating with the secure hardware device can be implemented as follows: The secure hardware device generates an authentication value and transmits the authentication value to the first or second application, the first or second application encrypts the received authentication value with the secret of the first or second secret set, respectively, and transmits the encrypted authentication value to the secure hardware device, which decrypts the encrypted authentication value with the first or second secret, respectively, and compares the decrypted authentication value with the generated authentication value and, only if both authentication values are identical, the secure hardware device uses the session key for encrypting and decrypting. By these steps it can be ensured that the secure hardware device is really communicating with the first or second application, respectively.

The authentication value can be a random value generated by the secure hardware device.

The group of secret sets is preferably defined such that it is impossible to derive a secret from a secret set if only the identifier of the secret set is known.

The secure hardware device is preferably used to avoid unauthorized use of the first and second application, respectively.

In the above described methods it is possible that the secret itself retrieved by the secure hardware device based on the identifier included in the session key indication data is used as session key. In this case the step of retrieving the secret and the step of retrieving the session key from the session key indication data are in fact one single step.

In a further aspect, the present invention is directed to an apparatus for changing a shared secret for generating a session key for secure communication between a secure hardware device connected to a computer and said computer, said apparatus comprising a key generator which generates a group of secret sets including at least two secret sets, each of which includes a secret and an assigned identifier, stores the group of secret sets in the secure hardware device in such a manner that the secure hardware device can retrieve the secret of any of said secret sets from the assigned identifier, and selects a first one of said secret sets and stores said selected first secret set in a first application, wherein the first application which includes the first secret set is delivered to a user who executes the first application on a computer being connected to the secure hardware device, wherein, in order to define and share a session key for secure communication, the first application defines a first session key and generates first session key indication data based on the first secret set, said first session key indication data including the identifier of the first secret set as the only element from the first secret set, and transmits said first session key indication data to the secure hardware device, which can retrieve, as a first secret, the secret of the first secret set based on the identifier include in the first session key indication data, and can further retrieve the first session key from said first session key indication data based on the first secret, and wherein the key generator selects a second one of said secret sets and stores said selected second secret set in a second application, which is delivered to said user executing the second application on a computer connected to the secure hardware device, wherein, in order to define and share a session key for secure communication, the second application defines a second session key and generates second session key indication data based on the second secret set, said second session key indication data including the identifier of the second secret set as the only element from the second secret set, and transmits said second session key indication data to the secure hardware device, which can retrieve, as a second secret the secret of the second secret set based on the identifier included in the second secret set indication data and can further retrieve the second session key from said second session key indication data based on the second secret.

In preferred embodiments the apparatus can be further embodied such that the above described methods as well as the further embodiments of the methods can be realized.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

The present invention may be better understood in conjunction with the following Figures:

FIG. 1 schematically illustrates a system for secure communication through an insecure communication channel

FIG. 8 schematically illustrates a computer for carrying out steps of the method according to the preferred embodiments.

DETAILED DESCRIPTION OF PREFERRED EMBODIMENTS

Figure 2:
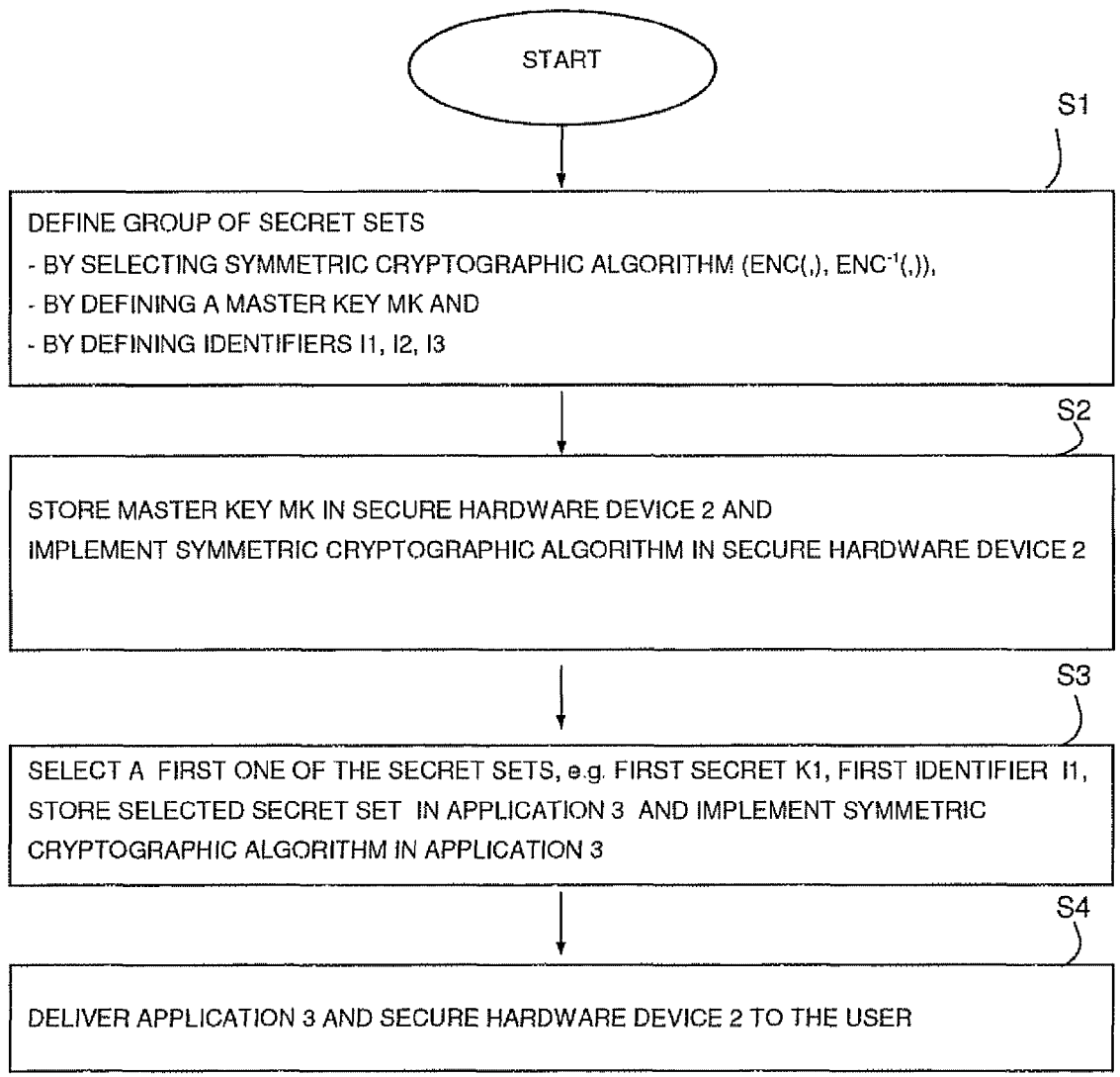
FIG. 2 is a flowchart explaining steps of a method for secure communication.

FIG. 1 schematically illustrates a system for secure communication in an untrusted and insecure environment. The system comprises a computer 1 connected to a secure hardware device 2. On the computer 1 a software application 3 is running which is communicating with the secure hardware device 2 through an insecure communication channel 4. The communication channel 4 is insecure since the secure hardware device 2 as well as the computer 1 are in the possession of a user and the hardware device 2 is connected to the computer 1 via a common interface 5, e.g. a USB port. Therefore, the user can eavesdrop on the communication between the hardware device 2 and the application 3.

In this embodiment, the secure hardware device 2 is used to avoid unauthorized use of the software application 3 and uses a symmetric encryption algorithm for communicating through the insecure channel 4. The secure hardware device 2 has a hardware-based encryption engine. During the runtime of the protected application 3 the secure hardware device 2 receives encrypted strings or data from the protected application 3. The encrypted strings or data are encrypted with a session key defined by the first software application 3 using the same symmetric encryption algorithm as implemented in the secure hardware device 2. The secure hardware device 2 decrypts the received encrypted strings or data and uses the decrypted strings or data to check whether or not the user is authorized to use the application 3 (or parts thereof. The necessary authorization is transmitted from the secure hardware device 2 to the application 3 in encrypted form using the session key.

Secure communication can be provided using the session key for encrypting and decrypting data to be transmitted through the insecure communication channel 4. However, the session key used for encryption has to be shared in a secure manner.

In order to be able to share the session key in a secure manner through the insecure communication channel 4 the software publisher or vendor of the software application 3 carries out the following steps (FIG. 2) before delivering the application 3 and the secure hardware device 2 to the user, who will use the first software application 3 and the secure hardware device 2 in the manner illustrated in FIG. 1.

As shown in the flow chart of FIG. 2 a group of secret sets including at least two secret sets (in this embodiment three secret sets), each of which includes a secret and an assigned identifier, is defined. This is done by selecting a symmetric cryptographic algorithm (ENC(,), ENC$^{-1}$(,)) by selecting a master key MK and by defining a set of identifiers I1, I2, I3.

With the cryptographic algorithm it is possible to generate encrypted data (ENC_data) encrypted with a selected key (ENC(key,data)=ENC_data). The encrypted data ENC_data can be decrypted by the reverse operation ENC$^{-1}$ (key,ENC_data)=data. Using the master key MK as key and the identifiers I1, I2, I3 as data it is possible to generate secrets K1, K2, K3 (encrypted identifiers I1, I2, I3, e.g. ENC(MK,I1)= ENC_I1=K1). In this manner it is possible to generate three secret sets, namely (K1, I1), (K2, I2) and (K3, I3).

In the following step S2 the master key MK is stored in the secure hardware device and the symmetric cryptographic algorithm (ENC(,), ENC−1(,)) is implemented in the secure hardware device. The hardware device 2 is considered to be secure since the master key MK is stored in the hardware device 2 in a place which is secure and is inaccessible for a cracker.

In step S3 a first one of the secret sets is selected (here the secret set including the first secret K1 and the first identifier I1) and is stored in the first application 3. Further, the symmetric cryptographic algorithm is implemented in the software application 3.

Then, the thus protected software application 3 and the secure hardware device 2 are delivered to the user (step S4) who will connect the secure hardware device 2 with the computer 1 on which he will execute the software application 3.

When the user starts the software application 3 for execution, it will be first checked whether or not the user is authorized to use the software application 3. This check requires communication between the software application 3 and the secure hardware device 2 through the insecure communication channel 4. In order to protect this communication against eavesdropping the communication will be encrypted with a session key in the following manner.

Figure 3:
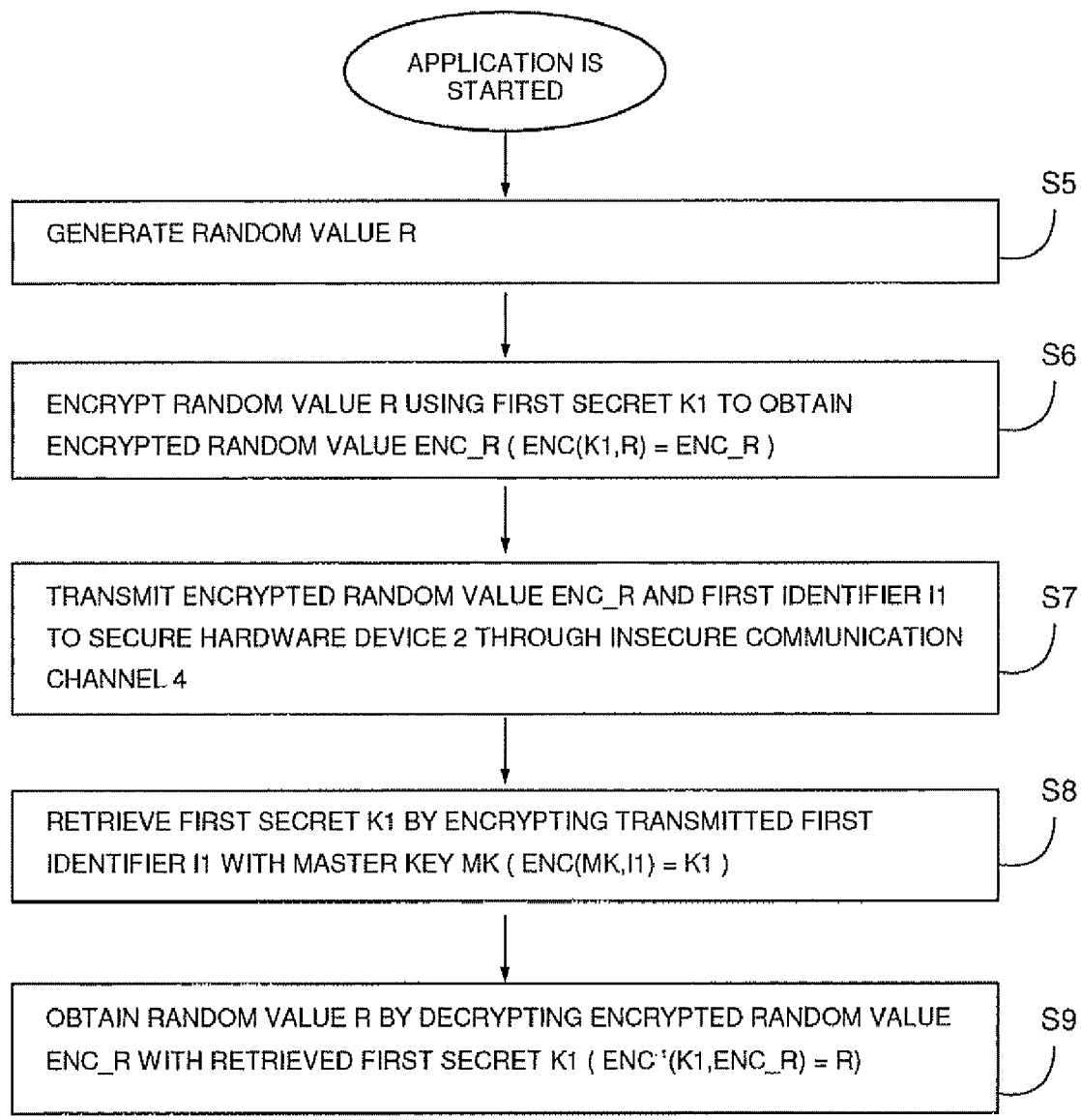
FIG. 3 is a flowchart explaining further steps of the method for secure communication.

The application 3 generates a random value R (step S5 in FIG. 3).

The application 3 encrypts the generated random value R using the first secret K1 stored in the application 3 so that an encrypt random value ENC_R is obtained (step S6).

The application transmits the encrypt random value ENG_R together with the identifier I1 as session key indication data to the secure hardware device 2 through the insecure communication channel 4 (step S7).

The secure hardware device 2 retrieves the first secret K1 used for encrypting the random value R by encrypting the received first identifier I1 with the master key MK stored in the secure hardware device 2 (step S8).

Using the thus obtained first secret K1 the secure hardware device 2 decrypts the encrypted random value (ENC$^{-1}$ (K1, ENC_R)=R; step S9), so that the secure hardware device 2 knows the random value.

As a result of the steps S5 to S9 the session key (random value R) generated by the application 3 is shared with the secure hardware device 2. Even if an eavesdropper has recorded the transmitted first identifier I1 and the encrypted random ENC_R the eavesdropper cannot retrieve the random value R used as the session key. Therefore, using the session key R for decrypting and encrypting the data to be transmitted to the insecure channel leads to secure communication through the insecure communication channel 4 between the secure hardware device 2 and the application 3.

Of course, it is possible to limit the validity of the session key with respect to time, transmitted data volume, and so on. In this case, a new session key (new random value) can be generated and shared by carrying out the above described steps S5 to S9.

In the above described embodiment the first secret K1 stored in the application 3 is always needed to share the session key generated by the application 3 with the secure hardware device 2 in a secure manner. Since the application 3 is in the possession of the user and a first secret K1 cannot be stored in an absolutely secure manner in the application 3 it has to be assumed that the secrecy of the secret K1 is limited in time. If, however, secrecy has been compromised by a cracker the encrypted communication through the insecure communication channel 4 is no longer secure.

Figure 4:
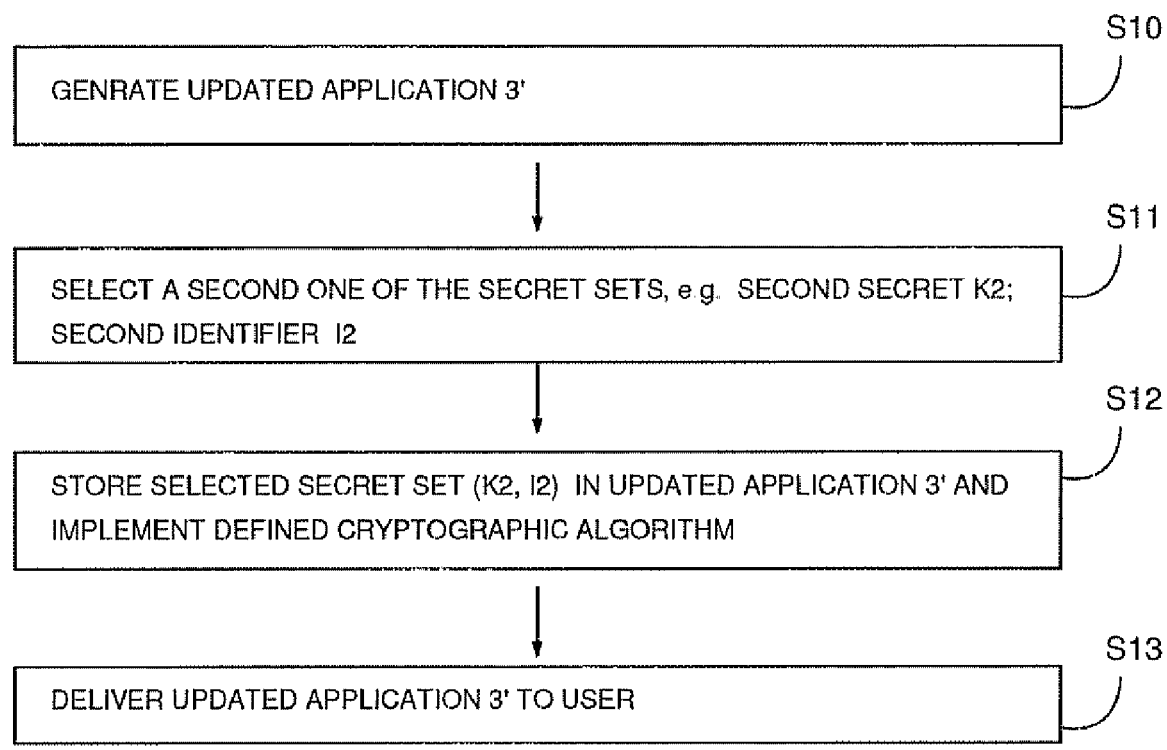
FIG. 4 is a flowchart of another embodiment of the method for secure communication.

In this case it is possible to update the application 3 such that the updated application 3' includes a second one of the secret sets of the group of secret sets defined in step S1, e.g.

second secret K2 and second identifier 12. In order to update the application 3 and include the second secret set, the vendor or software publisher only needs to generate the updated application 3' (step S10 in FIG. 4), to select a second one of the secret sets defined in step S1, e.g. K2 and 12 (step S1 in FIG. 4), store the selected second secret set in the updated application and implement the defined cryptographic algorithm in the updated application 3' (step S12) and deliver the updated application 3' to the user (step S13). It is not necessary to carry out any amendments in the secure hardware device 2 which is already in the possession of the user. An update of the secure hardware device 2 would lead to a more complicated update procedure compared to a simple update of the application 3.

In order to update the application 3 it is also possible to generate a software update module (instead of a complete updated software 3') in which software update module the selected secret set is stored in step S12. In this case the software update module including the second secret set is delivered to the user in step S13 and the software update module, when executed, generates together with the already installed application 3 the updated software application 3'.

Further, it is also possible to use step S10 to generate another software application which is not related to the software application 3. Thus, it is possible to use the secure hardware device 2 which is already in the possession of the user, for secure communication between the other software application and the secure hardware device 2 based on the second secret set without having to carry out any amendment in the secure hardware device 2.

Figure 5:
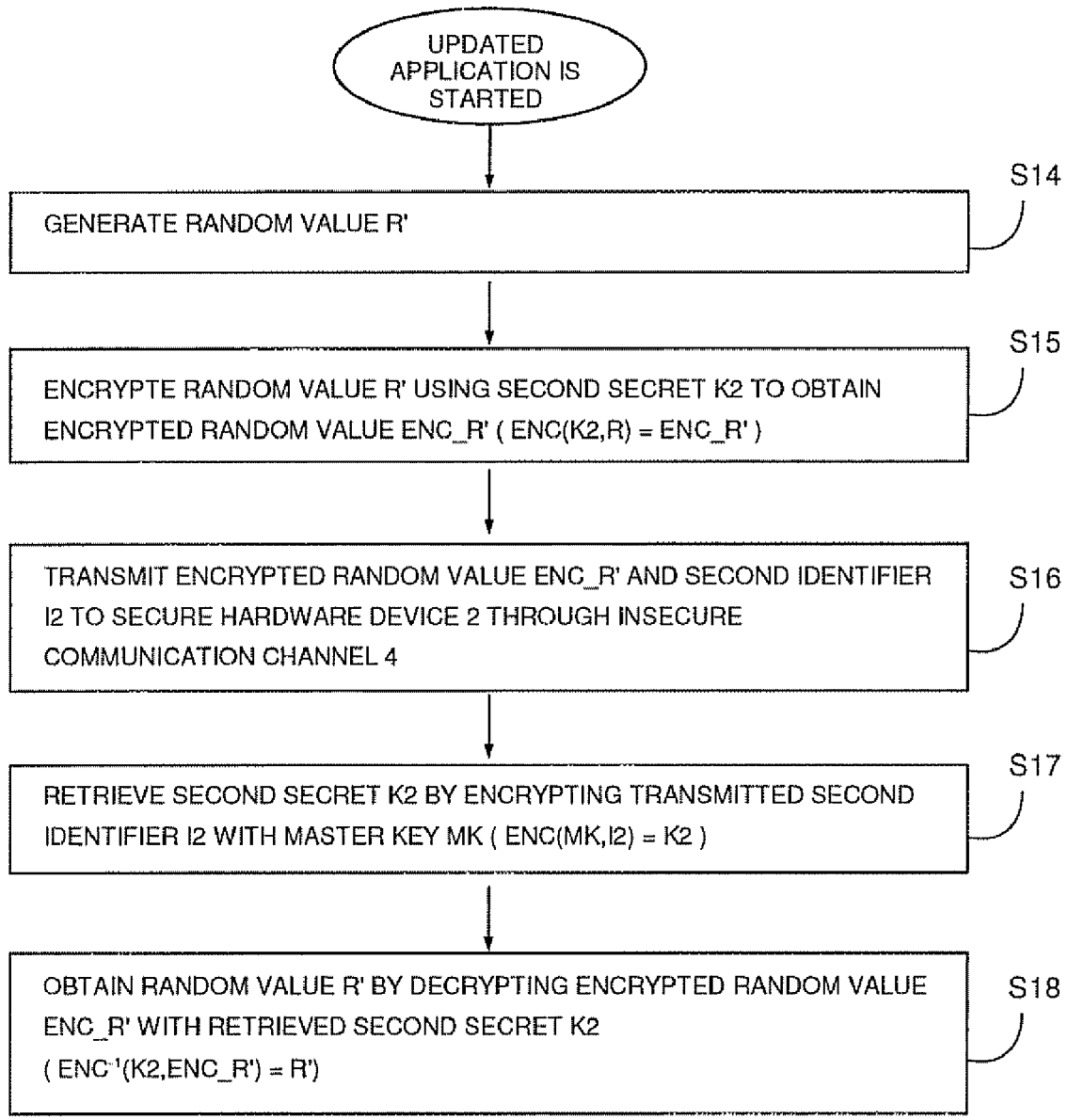
FIG. 5 is a flowchart of further steps of the further embodiment described in FIG. 4.

If the updated application 3' is started (cf. FIG. 5) and random value R' is generated (step 14) basically the same steps as described in connection with FIG. 3 are carried out. However, instead of using the first secret K1 for encrypting the random value R', the random value R' is encrypted with the second secret K2 (cf step S15 in the flow chart of FIG. 5). Further, the encrypted random value ENC-R' is transmitted together with the second identifier 12 to the secure hardware device 2 in step S16. The secure hardware device 2 retrieves the second secret K2 using the second identifier 12 (step 817) and obtains the random value R' by decrypting the encrypted random value ENC_R' using the second secret K2 (step S18).

Since the cracker only knows the first secret S1 and it is not possible to derive the second secret S2 from the first secret S1 the cracker does not benefit from cracking the application 3 for the updated application 3' so that the cracker is forced to crack also the updated application 3'.

Figure 6:
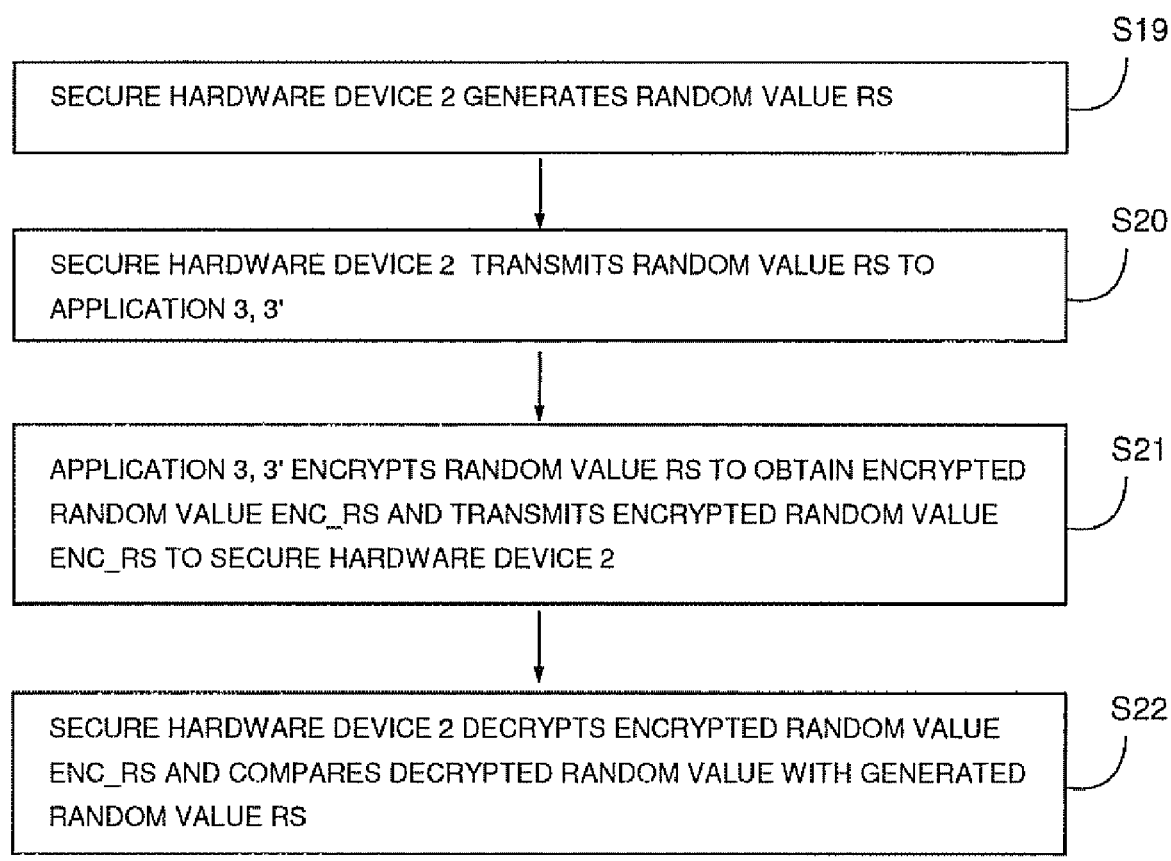
FIG. 6 is a flowchart describing an authentication procedure.

It is further possible to include steps in which the application or updated application authenticates itself for the secure hardware device. Such steps can be carried out after step S9 in FIG. 3 or step S18 in FIG. 5. In order to authenticate the secure hardware device 2 generates a random value RS (step S19 in FIG. 6) and transmits the random value RS to the application (step 520). The application generates an encrypted random value ENC_RS by encrypting the random value RS with the corresponding secret K1, K2, respectively, stored in the application and transmits the encrypted random value ENC_RS to the secure hardware device 2 (step S21). The secure hardware device 2 decrypts the encrypted random value ENC_RS with the retrieved secret K1, K2, respectively, of step S8 or S17 and compares the decrypted random value with the random value RS generated (step S22). If both values are identical, it can be assumed that the application really includes the first or second secret K1, K2, respectively, and is communicating with the secure hardware device 2 because only if it includes said secret K1 or K2 is the application able to correctly encrypt a value (random value RS) which cannot be influenced by the application.

In a further embodiment the secret sets are assigned to different levels and the secret sets are selected in the steps S3 and S10 in the order of the levels, i.e. the lowest level is selected first and the next level is selected in the next selection. In the secure hardware device 2 it is implemented (for example in step S2) that before retrieving a secret it is checked whether the secure hardware device has already retrieved a secret based on an identifier of a secret set of a level higher than the level of the identifier received. If this is true, the secure hardware device 2 stops the communication. If this is not true, the steps S8, S9; S17, S18 are carried out. Thus, it is possible to declare secret sets of levels invalid which are lower than the highest level of already used identifiers, by only using an application with secret sets of a certain level.

In a further embodiment a level can be set in the secure hardware device in a secure procedure. In this case, the secure hardware device only accepts secrets based on identifiers of secret sets of a level higher than the set level.

Figure 7:
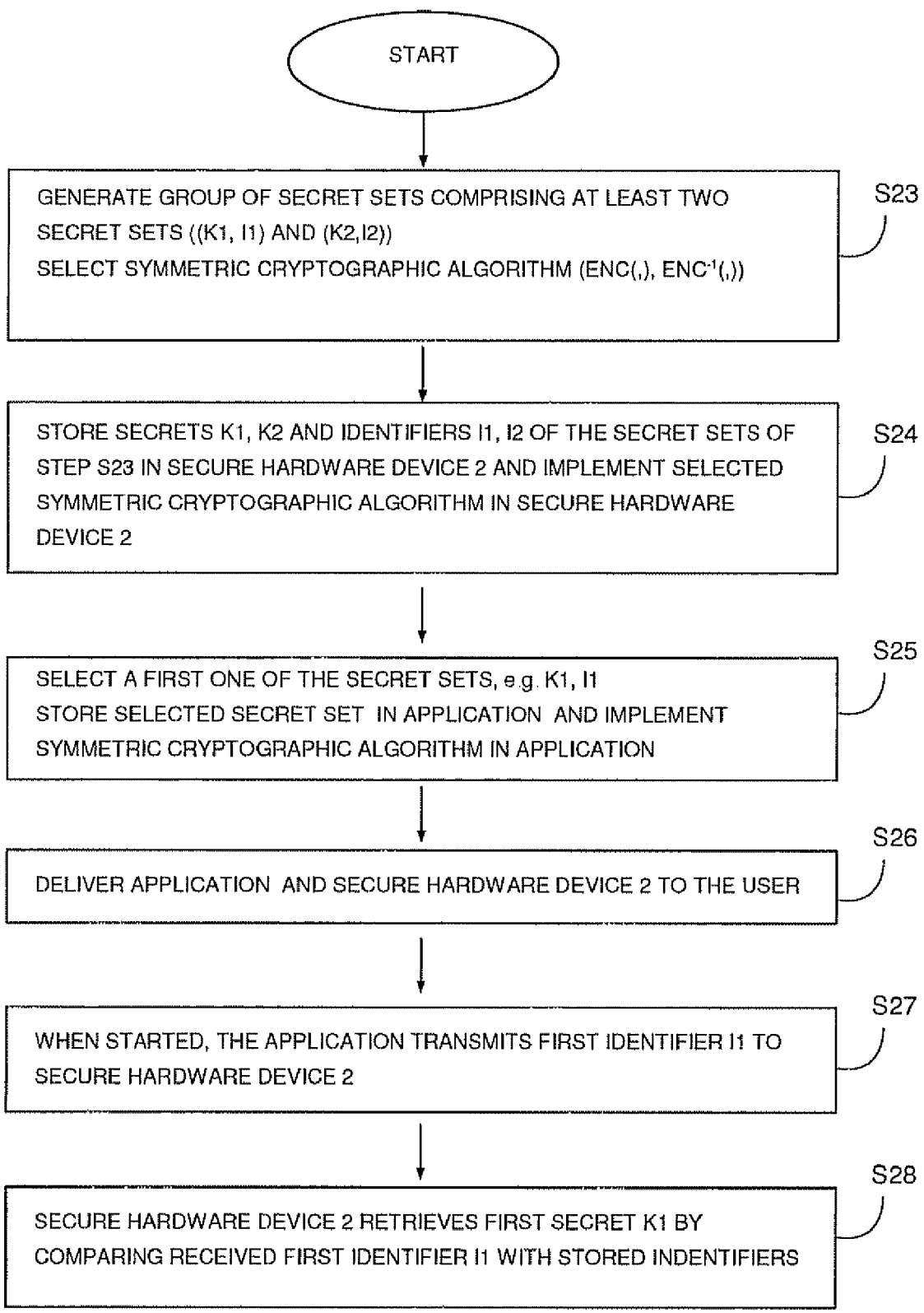
FIG. 7 is a flowchart describing another preferred embodiment of secure communication.

In another preferred embodiment the vendor or software publisher generates the group of secret sets such that at least two secret sets exist, namely a first secret K1 together with the assigned first identifier I1 and the second secret K2 together with the assigned second identifier I2 and selects a symmetric cryptographic algorithm (step S23 in FIG. 7).

In a next step (S24) both secret sets, i.e. the secrets K1 and K2 and the identifiers I1, I2, are stored in the secure hardware device 2, e.g. in the form of a table, and the selected symmetric cryptographic algorithm is implemented in the secure hardware device 2.

Then, a first one of the secret sets is selected, e.g. K1 and I1. This selected first secret set is stored in the application (step S25). The protected application and the secure hardware device 2 are delivered to the user (step S26).

When the user starts the application the application transmits the first identifier I1 as session key indication data to the secure hardware device (S26). The secure hardware device 2 compares the received identifier I1 with the stored identifiers and retrieves the first secret K1 as session key (S28). Then, the first secret K1 is used as shared session key for encrypting and decrypting data to be transmitted through the insecure channel 4.

Of course, it is also possible that the application generates a random value R, encrypts the random value and transmits the encrypted random value together with the first identifier I1 to the secure hardware device 2. The secure hardware device retrieves the first secret K1 by comparing the received first identifier I1 with the identifiers stored in the hardware device and uses the retrieved first secret for decrypting the encrypted random value which can then be used as the shared session key.

The above described embodiments can be combined in any suitable manner. In particular any steps described above can be combined in any suitable manner.

The steps S1-S3 and S10-S12 of methods of the preferred embodiments as described above can be carried out on a single computer 6 as schematically shown in FIG. 8, for example.

Although it is mentioned in the above description that a cryptographic algorithm is implemented in the secure hardware device (cf. steps S2 and S24) it is of course possible to use a secure hardware device 2 which already provides the desired cryptographic algorithm so that implementation of a cryptographic algorithm need not to be carried out (in step S2 and S24).

Those skilled in the art will appreciate that the invention can be embodied in other forms and ways without departing from the scope of the invention. The embodiments described herein should be considered as illustrative and not restrictive.

What is claimed is:

1. A method for secure communication between a secure hardware device connected to a computer and said computer, said method comprising the steps of:
   a) defining a group of secret sets including at least two secret sets, each of which includes a symmetric key and an assigned identifier,
   b) storing the group of secret sets in the secure hardware device in such a manner that the secure hardware device retrieves the symmetric key of any of said secret sets from the assigned identifier,
   c) selecting a first one of said secret sets and storing said selected first secret set in a first application,
   d) delivering the first application which includes the first secret set to a user who executes the first application on a computer being connected to the secure hardware device,
   e) wherein the first application defines a first session key and generates first session key indication data based on the first secret set, said first session key indication data including the identifier of the first secret set as the only element from the first secret set, and transmits said first session key indication data to the secure hardware device, which retrieves the symmetric key of the first secret set using the identifier included in said first session key indication data, and uses the retrieved symmetric key to set up the first session key, so that for secure communication the first session key is used as a symmetric key for encrypting and decrypting of data transmitted between the secure hardware device and the computer;
   f) selecting a second one of said secret sets and storing said selected second secret set in a second application,
   g) delivering said second application to said user executing the second application on a computer connected to the secure hardware device,
   h) wherein the second application defines a second session key and generates second session key indication data based on the second secret set, said second session key indication data including the identifier of the second secret set as the only element from the second secret set, and transmits said second session key indication data to the secure hardware device, which retrieves the symmetric key of the second secret set using the identifier included in the second session key indication data and uses the retrieved symmetric key of the second secret set to set up the second session key, so that for secure communication the second session key is used as a second symmetric key for encrypting and decrypting of data transmitted between the secure hardware device and the computer.

2. The method of claim 1, wherein in step e)
   the first application generates the first session key and encrypts the first session key with the symmetric key of said first secret set and transmits the identifier of said first secret set together with the encrypted first session key as said first session key indication data to said hardware device, and
   the secure hardware device decrypts the encrypted first session key using the retrieved symmetric key of the first secret set.

3. The method of claim 1, wherein in step h)
   the second application generates the second session key and encrypts the second session key with the symmetric key of said second secret set and transmits the identifier of said second secret set together with the encrypted second session key as said second session key indication data to said hardware device, and
   the secure hardware device decrypts the encrypted second session key using the retrieved symmetric key of the second secret set.

4. The method of claim 1, wherein
   in step a) the group of secret sets is defined by encrypting each of a group of identifiers with a master key using a symmetrical encryption method, and
   in step b) the master key is stored and the symmetrical encryption method is implemented in the secure hardware device.

5. The method of claim 1, wherein the second application delivered in step g) is an update for the first application running on the computer.

6. The method of claim 1, wherein the secret sets are assigned to different levels and once the secure hardware device has retrieved a symmetric key based on an identifier of a secret set of a first level the secure hardware device does not accept symmetric keys based on identifiers of secret sets of a level lower than said first level.

7. The method of claim 1, wherein the secret sets are assigned to different levels and in the secure hardware device, which is in the possession of the user, a first level can be set so that the secure hardware device only accepts symmetric keys based on identifiers of secret sets of a level higher than said first level.

8. The method of claim 1, wherein in step e) the first application generates a random value as said first session key.

9. The method of claim 1, wherein in step h) the second application generates a random value as said second session key.

10. The method of claim 1, wherein in step e)
    the secure hardware device generates an authentication value and transmits said authentication value to the first application
    the first application encrypts the received authentication value with the symmetric key of said first secret set and transmits the encrypted authentication value,
    the secure hardware device decrypts the encrypted authentication value with the retrieved symmetric key of the first secret set and compares the decrypted authentication value with the generated authentication value and, only if both authentication values are identical, the secure hardware device uses the first session key for encrypting and decrypting.

11. The method of claim 1, wherein in step h)
    the secure hardware device generates a second authentication value and transmits said second authentication value to the second application
    the second application encrypts the received second authentication value with the symmetric key of the second secret set and transmits the encrypted second authentication value,
    the secure hardware device decrypts the encrypted second authentication value with the retrieved symmetric key of the second secret set and compares the decrypted authentication value with the generated authentication value and, only if both authentication values are identical, the secure hardware device uses the second session key for encrypting and decrypting.

12. The method of claim 1, wherein in step a) the group of secrets sets is defined such that it is impossible to derive a symmetric key from a secret set if only the identifier of said secret set is known.

13. The method of claim 1, wherein the secure hardware device is used to avoid unauthorized use of said first application.

14. A method of establishing a secure communication channel in a renewable manner between a secure hardware device connected to a computer and said computer,
wherein a group of secret sets including at least two secret sets, each of which includes a symmetric key and an assigned identifier, is stored in the secure hardware device in such a manner that the secure hardware device retrieves the symmetric key of any of said secret sets from the assigned identifier, and
a first one of said secret sets is stored in a first application running on said computer, said method comprising the steps of:
A) said first application defining a first session key and generating first session key indication data based on the first secret set, said first session key indication data including the identifier of the first secret set as the only element from the first secret set, and transmitting said first session key indication data to the secure hardware device,
B) said secure hardware device retrieving the symmetric key of the first secret set using the identifier included in the first session key indication data and using the retrieved symmetric key to set up the first session key, so that for the secure communication channel the first session key is used as a symmetric key for encrypting and decrypting of data transmitted through the channel,
wherein, for renewing the secure communication channel,
C) a second application with a second one of said secret sets is executed on the computer connected to the secure hardware device,
D) said second application defining a second session key and generating second session key indication data based on the second secret set, said second session key indication data including the identifier of the second secret set as the only element from the second secret set, and transmitting said second session key indication data to the secure hardware device,
E) said secure hardware device retrieving the symmetric key of the second secret set using the identifier included in the second session key indication data and using the retrieved symmetric key of the second secret set to set up the second session key, so that for the secure communication channel the second session key is used as a symmetric key for encrypting and decrypting of data transmitted through the channel.

15. An apparatus for changing a shared secret for generating a session key for secure communication between a secure hardware device connected to a computer and said computer, said apparatus comprising:
a key generator which generates a group of secret sets including at least two secret sets, each of which includes a symmetric key and an assigned identifier,
a processor which stores the group of secret sets in the secure hardware device in such a manner that the secure hardware device retrieves the symmetric key of any of said secret sets from the assigned identifier, and
a selector which selects a first one of said secret sets and stores said selected first secret set in a first application,
wherein the first application which includes the first secret set is delivered to a user who executes the first application on a computer being connected to the secure hardware device, wherein, in order to define and share a session key for secure communication, the first application defines a first session key and generates first session key indication data based on the first secret set, said first session key indication data including the identifier of said first secret set as the only element from the first secret set, and transmits said first session key indication data to the secure hardware device, which retrieves the symmetric key of the first secret set based on the identifier included in the first session key indication data and uses the retrieved symmetric key to set up the first session key, so that for secure communication the first session key is used as a symmetric key for encrypting and decrypting of data transmitted between the secure hardware device and the computer,
and wherein the selector selects a second one of said secret sets and stores said selected second secret set in a second application, which is delivered to said user and executed on a computer connected to the secure hardware device,
wherein, in order to define and share a second session key for secure communication, the second application defines the second session key and generates second session key indication data based on the second secret set, said second session key indication data including the identifier of the second secret set as the only element from the second secret set, and transmits said second session key indication data to the secure hardware device, which retrieves the symmetric key of the second secret set based on the identifier included in the second session key indication data and uses the retrieved symmetric key of the second secret set to set up the second session key, so that for secure communication the second session key is used as a symmetric key for encrypting and decrypting of data transmitted between the secure hardware device and the computer.

* * * * *